(12) United States Patent
Leinonen et al.

(10) Patent No.: US 7,865,167 B2
(45) Date of Patent: *Jan. 4, 2011

(54) DIGITAL VIDEO BROADCAST-TERRESTRIAL (DVB-T) RECEIVER INTEROPERABLE WITH A GSM TRANSMITTER IN A NON-INTERFERING MANNER

(75) Inventors: Marko Leinonen, Oulu (FI); Veijo Korhonen, Oulu (FI)

(73) Assignee: Nokia Corporation, Espoo (FI)

( * ) Notice: Subject to any disclaimer, the term of this patent is extended or adjusted under 35 U.S.C. 154(b) by 1873 days.

This patent is subject to a terminal disclaimer.

(21) Appl. No.: 10/164,177

(22) Filed: Jun. 5, 2002

(65) Prior Publication Data
US 2003/0236065 A1  Dec. 25, 2003

(51) Int. Cl.
H04B 1/16 (2006.01)
H04W 24/00 (2009.01)
H04B 1/44 (2006.01)
H04B 1/04 (2006.01)
H04B 1/10 (2006.01)
H01Q 11/12 (2006.01)
H04N 7/16 (2006.01)

(52) U.S. Cl. .................. 455/343.2; 455/456.4; 455/78; 455/127.1; 455/127.5; 455/222; 725/62

(58) Field of Classification Search .................. 725/62; 455/343.2, 456.4, 78, 127.1, 127.5, 222
See application file for complete search history.

(56) References Cited

U.S. PATENT DOCUMENTS 4,723,249 A * 2/1988 Ouhayoun .................. 372/32

5,648,767 A * 7/1997 O'Connor et al. ........... 340/928

(Continued)

FOREIGN PATENT DOCUMENTS

EP  1 180 851 A2  2/2002

(Continued)

OTHER PUBLICATIONS

NTIA, Comments of theNational Telecommunications and Information Administration, Jan. 1999, http://www.ntia.doc.gov/ntiahome/fccfilings/pubsafe3rdnprm.htm.*

(Continued)

*Primary Examiner*—Hoang-Vu A Nguyen-Ba
(74) *Attorney, Agent, or Firm*—Harrington & Smith

(57) ABSTRACT

A method and a device used for displaying wideband information to a user has a return channel made through a cellular mobile terminal providing interactivity. The device includes a receiver for communicating in a first band of radio frequencies and a transmitter for communicating in a second band of radio frequencies. The method includes receiving information in a symbol-wise manner with the receiver in a first band of RF frequencies; generating a notification of an occurrence of a burst transmission from the transmitter; and in response to the notification, terminating the reception of the information for a portion of one symbol time corresponding to a duration of the burst transmission. The method may include an optional step, further in response to the notification, of reducing power consumption by turning off at least a portion of the receiver for a period of time corresponding to the duration of the burst transmission.

26 Claims, 6 Drawing Sheets

U.S. PATENT DOCUMENTS

| | | | | |
|---|---|---|---|---|
| 5,917,812 | A * | 6/1999 | Antonio et al. | 370/337 |
| 6,107,960 | A | 8/2000 | Krasner | 342/357.09 |
| 6,549,567 | B1 | 4/2003 | Fullerton | 375/219 |
| 6,757,261 | B1 * | 6/2004 | Olgaard et al. | 370/280 |
| 2002/0010763 | A1 | 1/2002 | Salo et al. | 709/220 |
| 2002/0022476 | A1 * | 2/2002 | Go | 455/414 |

FOREIGN PATENT DOCUMENTS

| | | |
|---|---|---|
| GB | 2 360 655 A | 9/2001 |
| WO | WO 01/39576 A1 | 6/2002 |

OTHER PUBLICATIONS

Francisco Guirao, Convergence of Mobileand Broadcast, Nov. 29, 2000, Workshop on Multiradio Multimedia Communications, Berlin.*

PSWN, Public Safety, Radio Spectrum: A Vital Resource for Saving Lives and Protecting Property, undated.*

Kasimir, Zagurski, Radio-Frequency Data Transmission for Remote-Controlled Mechatronic Systems, 2002, Central Laboratory of Mechatronic and Instrumentation, 1113 Sofia, Bulgary.*

"Digital Video Broadcasting (DVB); Framing Structure, channel coding and modulation for digital terrestrial television." Draft EN 300 744 v1.2.1 (Jan. 1999) European Standard, Telecommunications Series. European Broadcasting Union.

Hamacher C., "Spectral Coexistence of DVB-T and UMTS in a Hybrid Radio System", Sep. 1, 2001, 6 pgs., $1^{st}$ Mobile Communications Summit.

Public Safety PSWN Program Wireless Network "Public Safety Radio Frequency Spectrum Digital Television Transition Status Update" Jan. 2002 pp. 1-14.

J.H. Scott "The How and Why of COFDM", Tutorial-COFDM, EBU Technical Review—Winter 1998, pp.1-14.

Magnus Eriksson, "Evaluation of Packet-by-Packet Downlink Radio Resource Management Schemes", VTC'01, Rhodes, Greece, Jun. 6-9, 2001.

Magnus Eriksson, "Dynamic Single Frequency Networks", IEEE Journal on Selected Areas in Communications, vol. 19, No. 10, Oct. 2001 pp. 1905-1914.

Nokia Connecting People, "Future Technology STC", Copyright © Nokia Multimedia Terminals Oy 2000.

Junko Yoshida, "Nokia Redefines Digital TV as a Mobile Device" pp. 1-4, EE Times Apr. 22, 2002.

* cited by examiner

US 7,865,167 B2

DIGITAL VIDEO BROADCAST-TERRESTRIAL (DVB-T) RECEIVER INTEROPERABLE WITH A GSM TRANSMITTER IN A NON-INTERFERING MANNER

TECHNICAL FIELD

These teachings relate generally to methods and apparatus for operating a digital video/data receiver in close proximity to a potentially interfering transmitter and, more specifically, relate to methods and apparatus for operating a DVB-T receiver in close proximity to a cellular telephone transmitter, which could be a Time Division Multiple Access (TDMA) Global System for Mobile Communication (GSM) transmitter, such as one used to provide a return channel to a source of data that is received through the DVB-T receiver.

BACKGROUND

DVB-T was first adopted as a standard in 1997, and is currently rapidly expanding in Europe, Australia and Asia. DVB-T offers about 24 Mb/s data transfer capability to a fixed receiver, and about 12 Mb/s to a mobile receiver using an omnidirectional antenna. Some distinguishing technical features of DVB-T include the following: DVB-T offers a net bit rate (R) per frequency channel in the range of about 4.98 to 31.67 Mbit/s and operates with a channel separation of 8 MHz in the UHF range of 470-862 MHz (in the VHF 174-216 MHz range the channel separation is 7 MHz). Single frequency networks can be used. DVB-T uses a Coded Orthogonal Frequency Division Multiplex (COFDM) multi-carrier technique with QAM, 16 QAM or 64 QAM carrier modulation. The number of sub-carriers can be between 1705 (2 k) to 6817 (8 k). Inner forward error correction coding (FEC) uses convolutional coding with rates ½, ⅔, ¾, ⅚ or ⅞, while an outer coding scheme uses Reed-Solomon (204,188,t-8) coding. Outer bit-interleaving uses convolutional interleaving of depth 0.6-3.5 msec.

While DVB-T was developed for MPEG-2 Transport stream distribution, it is capable of carrying other types of (non-video) data. For example, DVB-T can provide a broadband, mobile wireless data transport for video, audio, data and Internet Protocol (IP) data. DVB-T is scalable, with cells sizes ranging from, for example, 100 km down to picocells (e.g. tens to hundreds of meters). The capacity is very large, e.g, 54 channels can be supported, each running at 532 Mbit/s. One TS-packet is 188 (204) bytes long.

Due to the large number of sub-carriers the symbol time can be made very long. For example, for the 8 k sub-carrier case the symbol time is on the order of 1 millisecond. A guard interval is inserted before each symbol.

Thus, it can be realized that while well suited for providing digital video streams, DVB-T can be used to provide high speed data streams for other types of applications, such as interactive services, Internet access, gaming and e-commerce services. As can be appreciated, for interactive and other services to be provided a return link or channel is required from the user back to some server or other controller. One example of such as a system is known as MediaScreen™ that was shown by the assignee of this patent application. This device provides a LCD display screen for displaying information received from a DVB-T downlink, and includes a GSM function having a transmitter to provide the return link or channel.

In WO 01/39576, "Charging in Telecommunication System Offering Broadcast Services", published Jun. 7, 2001, Risto Mäkipää and Jorma Havia (Alma Media Oyj) describe a system having a terminal and a broadcast network offering broadcast services. The terminal selects the information to be broadcast by means of a reverse connection made through, for example, a third generation mobile system, embodied as a Universal Mobile Telecommunications System (UMTS) network.

A problem that may be created by the transmission of the DVB-T signal is interference into the UMTS receive band (beginning at about 826 MHz). This problem was recognized and discussed by C. Hamacher "Spectral Coexistence of DVB-T and UMTS in a Hybrid Radio System", ComNets, and the use of a guard band (GB) is discussed. FIG. 1 of this patent application is based on FIG. 1 of Hamacher, and shows an adjacent channel interference (ACI) scenario, with transmitter masks defined by the relevant DVB-T and UMTS standards, and the receiver filters assumed to be ideal. In Section VI (Conclusions and Future Work) the author states that comparable studies with DVB as a victim system would be performed.

In an article entitled "Evaluation of Packet-by-Packet Downlink Radio Resource Management Schemes", in VTC'01, Rhodes, Greece, Jun. 6-9, 2001, and in an article entitled "Dynamic Single Frequency Networks", IEEE Journal on Selected Areas in Communications, Vol. 19, No. Oct. 10, 2001, pgs. 1905-1914, Magnus Eriksson discusses asymmetric Internet access using a DVB-T downlink with a cellular system, i.e., GSM, as the narrowband uplink. These articles discuss the use of dynamic radio resource management (RRM) techniques, such as dynamic channel allocation (DCA), link adaptation and traffic adaptive handover to improve spectral efficiency.

The inventors have realized that a potential exists for a problem in the DVB-T receiver when an associated return channel cellular system (e.g., GSM) transmitter is operational, especially in the case where there is only a small physical separation between the two antennas (i.e., the two antennas are operating in the near field, and antenna radiation pattern filtering cannot be employed in the receiver filtering arrangement.) Furthermore, this problem is not limited to the use of GSM for the return channel, but can occur as well should a GSM voice call or a data call be made when DVB-T reception is ongoing. For example, the user might perform a digital packet access via a GSM/EDGE network to an e-mail server or a similar packet protocol system. Furthermore, a WAP communication can be made during DVB-T reception to view a schedule of television programming that is available from a WAP/WEB server.

The problem arises because the lower end of the GSM transmission band begins at 880 MHz, while the upper end of the received DVB-T frequency band ends at 862 MHz. Thus, transmitted energy from the GSM band can leak into the DVB-T receiver, resulting in errors in the received data. This is shown graphically in FIG. 2. The point labeled as A designates the GSM 900 MHz −23 dBm receiver blocking level used for an in-band blocking measurement. The spurious in-band blocking specification to one tone is −23 dBm at 3 MHz, and −31 dBm at 6 MHz. If one assumes that the GSM900 average transmitted power is +33 dBm, with reference to FIG. 3, and assumes a reasonable 6 dB of antenna isolation from the GSM antenna 20 to the DVB-T antenna 12 (an exact figure is difficult to discern, as the antennas are assumed to be in the near field, and antenna pattern filtering is not usable), then the power seen at the input to the DVB-T receiver 14 is +27 dBm, which is more than 30 dB greater in spurious signal level than in the GSM receiver 22. In FIG. 2 the delta (Δ) indicates the more strenuous (50 DB) difference in the required DVB-T blocking requirement. The DVB-T receiver sees significant GSM transmitter noise in the 8 k sub-carrier band at the upper (862 MHz) end of the DVB-T spectrum. This is an undesirable situation, as errors can be experienced in the DVB-T reception when the GSM transmitter is active.

While at first glance it may seem that one could simply implement a highly linear DVB-T receiver, in practice this is difficult to achieve in a cost effective and a low power consumption manner, both of which are important considerations when building portable, battery powered consumer devices. If the GSM transmission from the lowest GSM transmit channel were to be adequately filtered from the DVB-T receiver when operating at the highest channel, a very steep filter would be required. The steepness of the required filter implies that the insertion loss at the passband of the DVB-T receiver is increased, and thus the sensitivity of the receiver would be reduced.

It should be noted that while the foregoing discussion has concentrated on specific DVB-T frequencies and the European GSM system, the same problems can arise in other locations where Digital Television has been specified for use. For example, in the United States of America digital television is referred to as ATSC (Advanced Television Systems Committee), and the FCC has allocated the frequency bands of 764-776 MHz and 794-806 MHZ for Digital Television (DTV) broadcasts. One U.S. cellular transmission band (already occupied) has been established from 824-849 MHz. As can be noted, the upper boundary of the DTV band (806 MHz) is separated from the lower end of the cellular transmit band by only 18 MHz, about the same separation that is seen in the DVB-T/GSM embodiment described above.

SUMMARY OF THE PREFERRED EMBODIMENTS

The foregoing and other problems are overcome, and other advantages are realized, in accordance with the presently preferred embodiments of these teachings.

A method and a device used for displaying wideband information to a user has a return channel made through a cellular mobile terminal (CMT) for providing user interactivity. The device has a first antenna and a second antenna that are near one another, a receiver that is coupled to the first antenna and a transmitter that is coupled to the second antenna. The method includes receiving information in a symbol-wise manner with the receiver in a first band of RF frequencies; generating a notification of an occurrence of a burst transmission from the transmitter; and in response to the notification, terminating the reception of the information for a portion of one symbol time corresponding to a duration of the burst transmission. The method may include an optional step, further in response to the notification, of reducing power consumption by turning off at least a portion of the receiver for a period of time corresponding to the duration of the burst transmission.

In one embodiment the first band of radio frequencies is a DVB-T 470-862 MHz reception band, and the second band of radio frequencies is a GSM 880-915 MHz transmission band. In another embodiment the first band of radio frequencies is a DTV 794-806 MHz reception band, and the second band of radio frequencies is a CMT 824-849 MHz transmission band.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
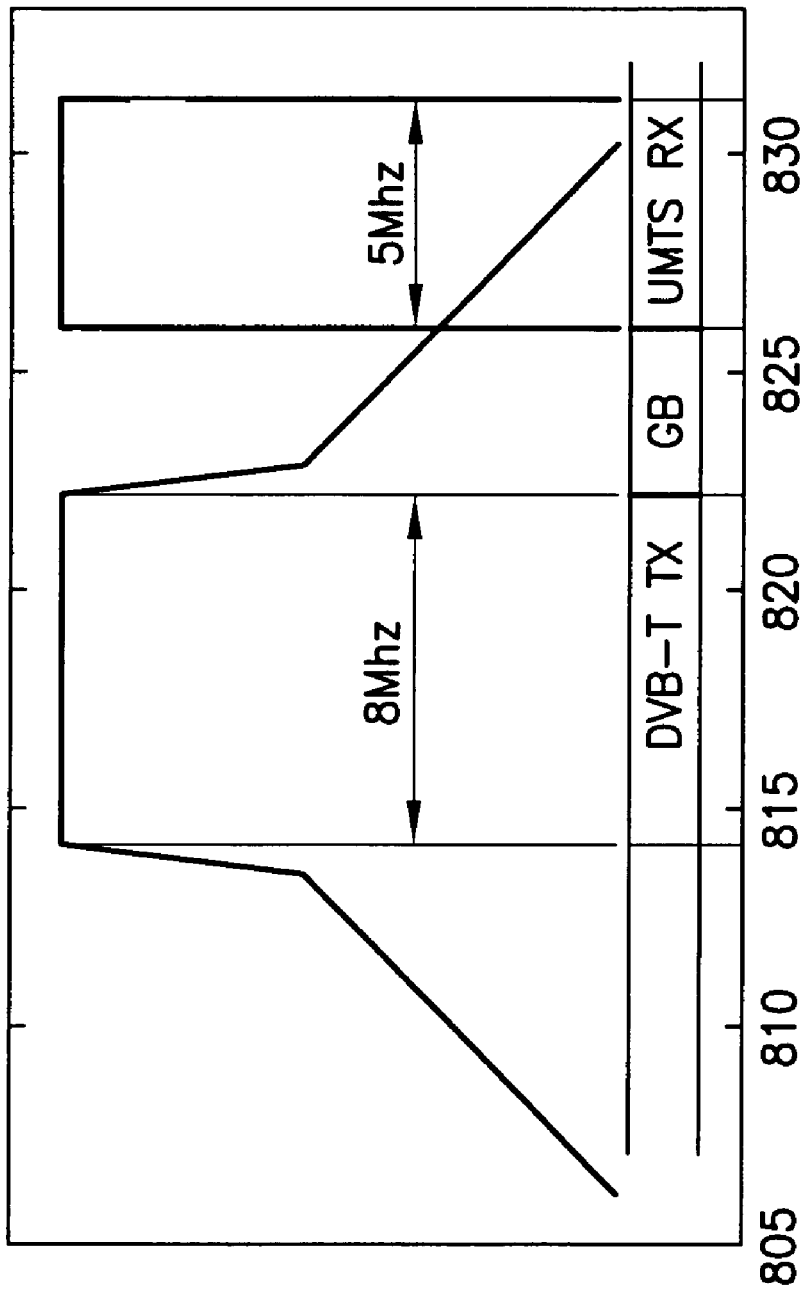
FIG. 1 is a graph taken from the prior art that shows an adjacent channel interference (ACI) scenario with interference from the DVB-T transmission band into the UMTS receive band.
Figure 2:
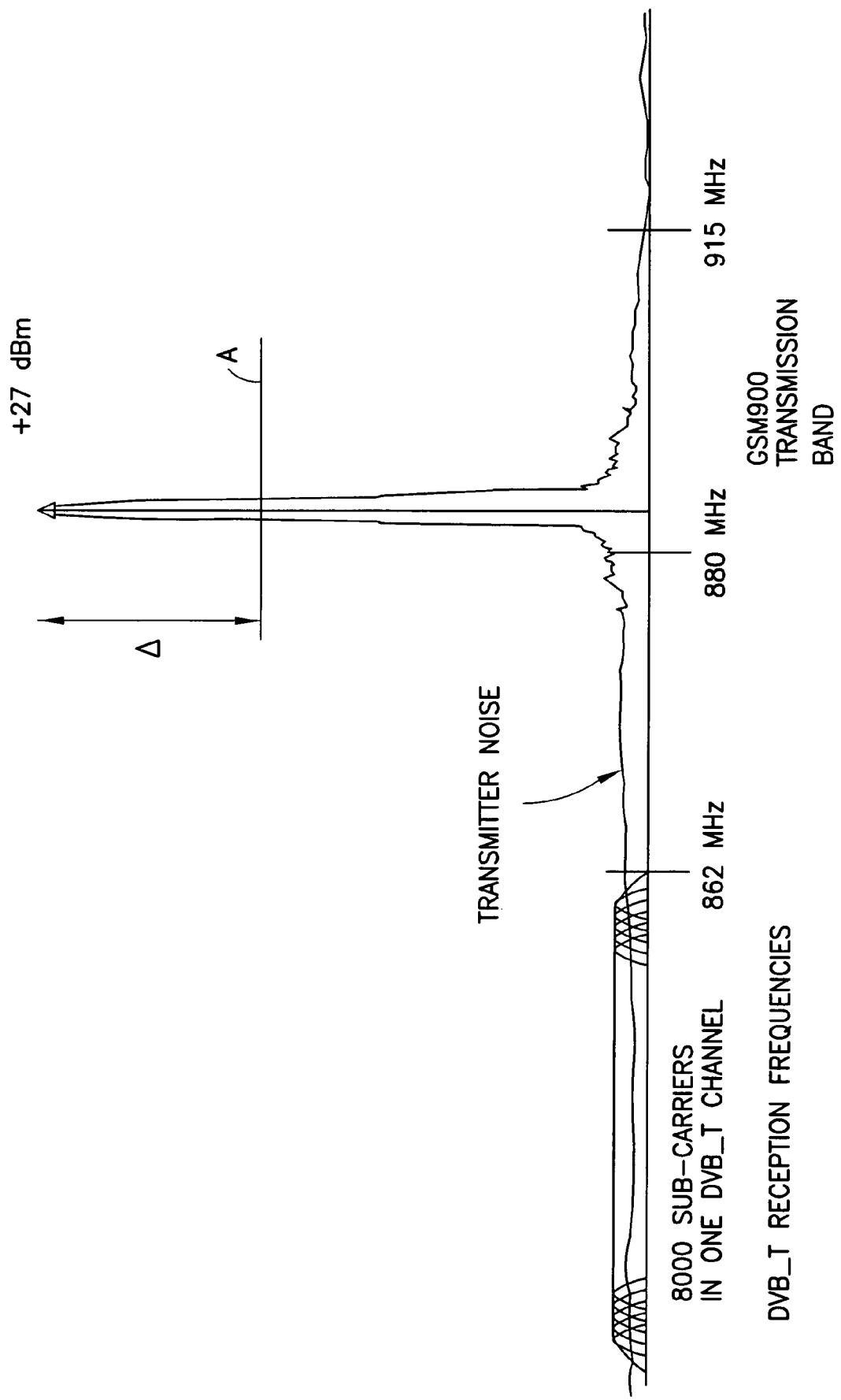
FIG. 2 is a graph that is useful in understanding the problem that is solved by this invention, where co-located GSM and DVB-T antennas result in GSM burst energy leaking into the DVB-T receiver.
Figure 3:
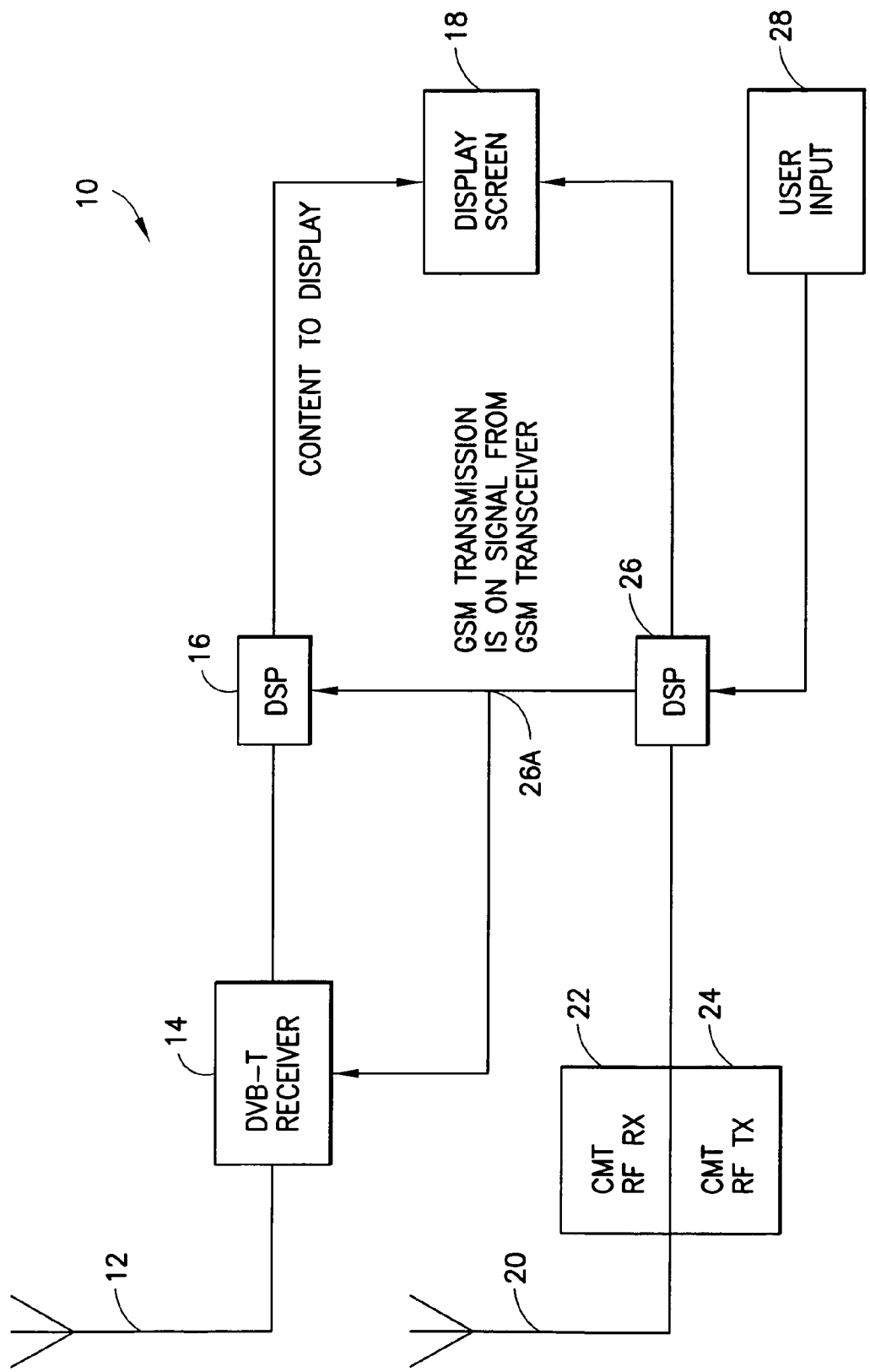
FIG. 3 is a block diagram of a DVB-T/cellular mobile terminal (CMT) enabled device constructed in accordance with this invention to provide a burst notification from the CMT part to the DVB-T part.

FIG. 3 is a block diagram of an embodiment of a portable device 10 that includes a DVB-T antenna 12, a DVB-T receiver 14, an associated DVB-T signal processor, such as a DVB-T digital signal processor (DSP) 16 and a display 18 for displaying to a user data, such as video or Internet data, that is received from a DVB-T transmitter (not shown). The device 10 also includes a cellular mobile terminal (CMT) that includes a CMT antenna 20, a CMT RF receiver (RX) 22, a CMT RF transmitter (TX) 24 and a CMT DSP 26. The CMT DSP 26 may also be coupled to the display 18 for displaying information received from a remote CMT transmitter (not shown). In a non-limiting example, the DVB-T system operates in the UHF range of 470-862 MHz, and the CMT system is a GSM system, specifically a GSM 900 MHz system, wherein the lower end of the transmitter spectrum is at 880 MHz (see FIG. 2).

Note that the device 10 will typically include some type of user input device 28 such as a keypad, keyboard, mouse, or mouse emulator that provides the interactivity required for the applications of most interest to this invention. For example, if IP data is being delivered through the DVB-T receiver 14, 16 to the display screen 18, and a web page is displayed, the user may interact with the web page in a conventional manner by typing in information, or pointing and clicking with a mouse or similar pointing device that comprises the user input 28. This relatively low bandwidth user input data is eventually coupled into the CMT DSP 26 (through suitable user interface I/O circuitry, as is well known) where it is formatted into a data stream that is transmitted in a burst-wise fashion, using the CMT transmitter 24 and the CMT antenna 20, back to some server or other controller that is typically also the source of the DVB-T data stream. It is these CMT transmissions, due at least in part to the fact that the CMT antenna 20 is essentially co-located with the DVB-T antenna 12, that results in DVB-T reception errors.

Note that a data stream can also be received through CMT receiver 22, such as packet acknowledgment messages and supervisory information. Some of the CMT-received data may also be displayed to the user on the display screen 18.

It should further be noted that circuitry may be provided, such as a microphone and speaker, for enabling normal voice calls to be made using the CMT.

Figure 4:
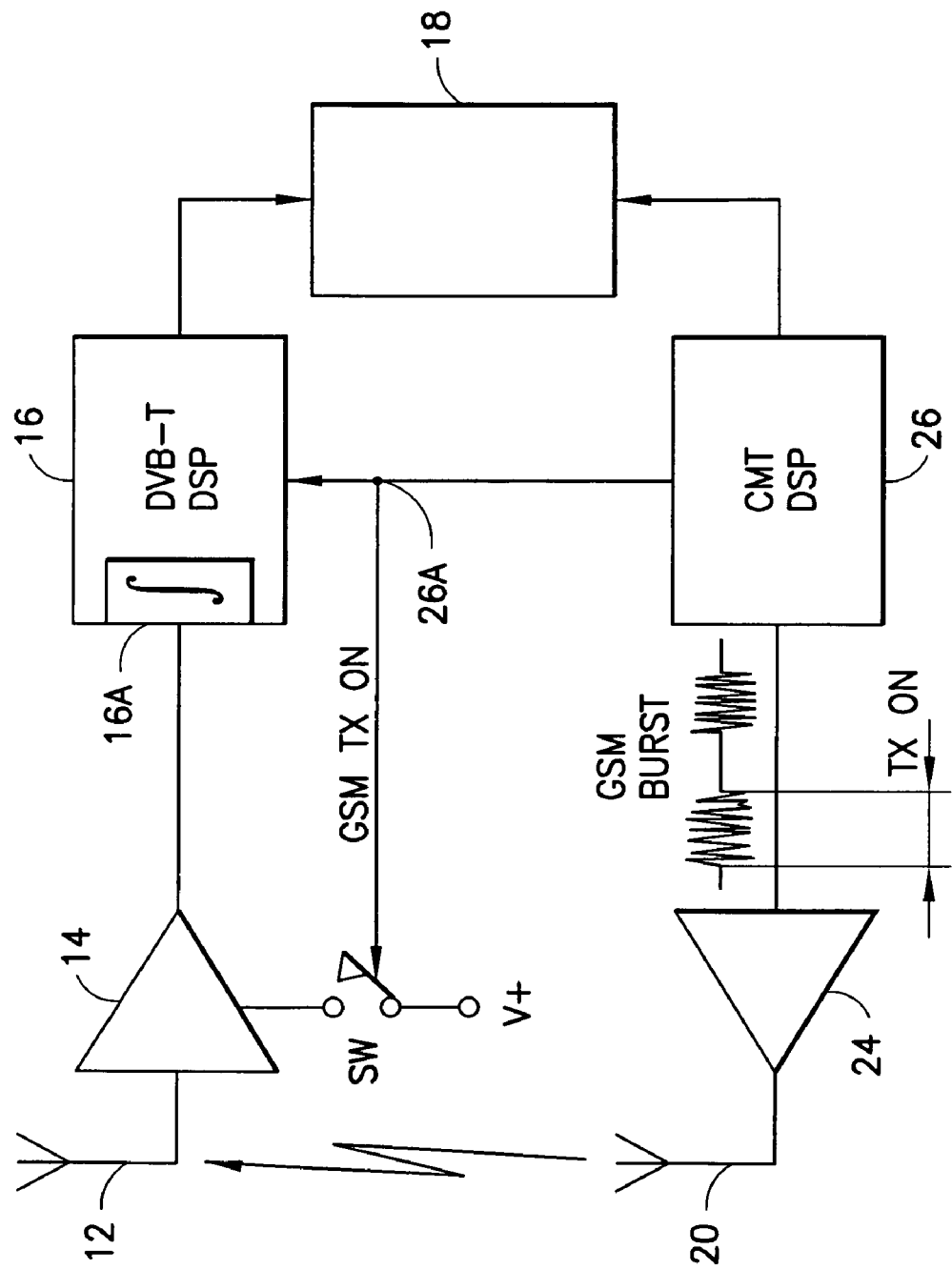
FIG. 4 is a more detailed block diagram of a portion of the circuitry shown in FIG. 3.
Figure 5:
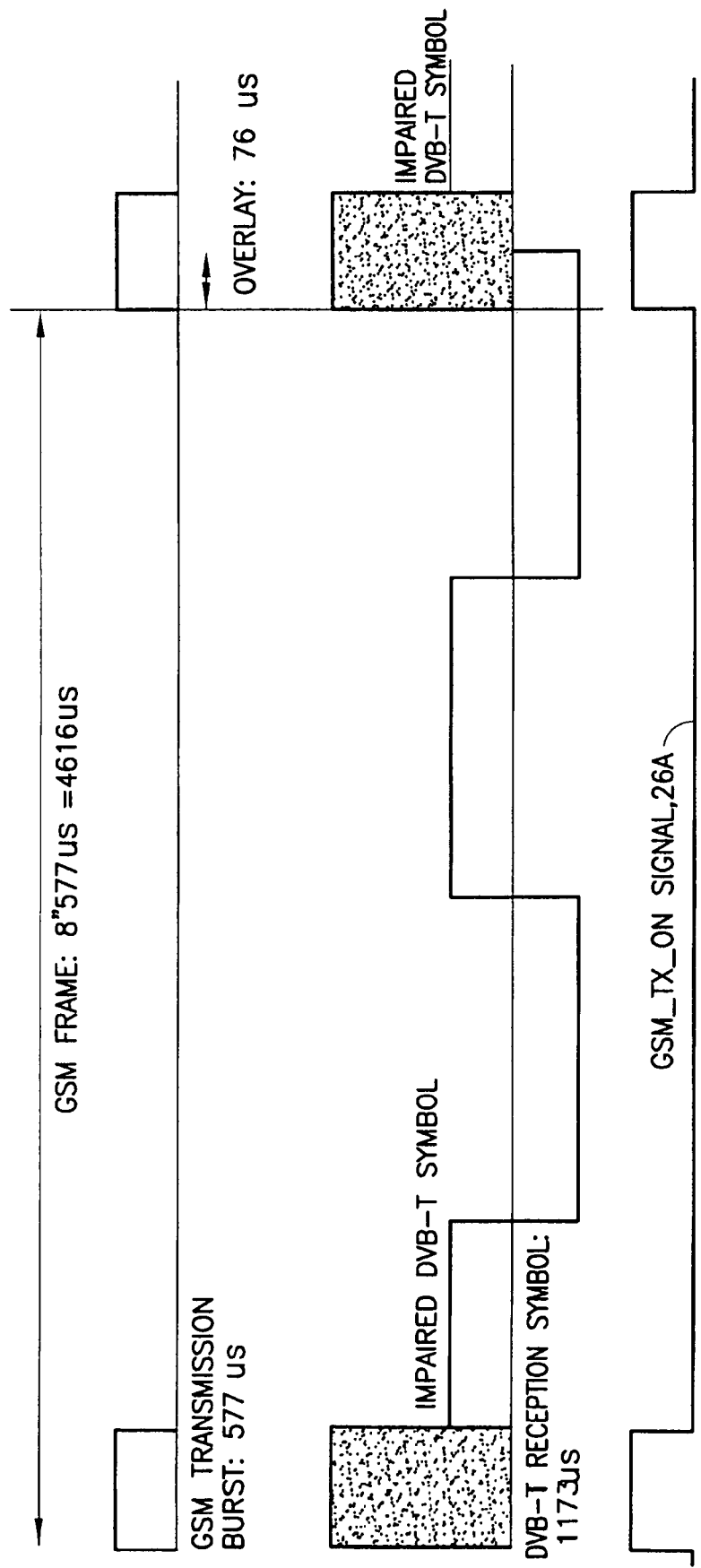
FIG. 5 is waveform diagram that is useful in explaining the operation of the burst notification system.

Referring also to FIGS. 4 and 5, when the GSM900 transmitter 24 is on at full power, the 577 microsecond long burst is transmitted with +33 dBm power. If at the same time the DVB-T receiver 14 is attempting to receive (assuming that the antenna 12 is physically close to the antenna 20), then the linearity requirement of the receiver 14 becomes very demanding. If the DVB-T receiver 14 is optimized for this environment then it will consume excessive power in the normal operational mode when the GSM transmitter 24 is not on and the GSM carrier is not present.

If the GSM900 band were to be filtered out of the DVB-T receiver 14 approximately 50 dB of filtering would be required with a 20 MHz transition. While this is comparable to what is required in the PCS1900 MHz CDMA or WCDMA band, the operation frequency (about 900 MHz) is only about one half, making the implementation even more difficult. Furthermore, about 4 dB of insertion loss is experienced when filtering in the PCS1900 MHz band, implying that even greater insertion loss would be experienced if it were attempted to filter out the GSM900 MHz band from the DVB-T receiver 14.

In accordance with this invention the foregoing problems are solved by providing a signal line (GSM_TX_ON) 26A from the GSM DSP 26 to the DVB-T DSP 16 and receiver 14. The signal line GSM_TX_ON 26A, when asserted by the GSM DSP 26, means that a GSM burst is being transmitted. During this time the DVB-T DSP 16 ignores that part of a received DVB-T symbol. As can be seen in FIG. 5, in one embodiment, the DVB-T symbol can have a duration of 1173 microseconds, about twice the duration of the GSM burst. The GSM burst will reoccur once per GSM frame (8 times 577 microseconds or 4616 microseconds, about four times the duration of one DVB-T reception symbol). When the GSM burst is present, it affects all symbols of all DVB-T sub-carriers simultaneously. In the preferred embodiment the signal GSM_TX_ON 26A is also used to remove, or reduce, power (V+) to the DVB-T receiver 14, thereby conserving battery power and also preventing wide band noise from the GSM burst from entering the DVB-T integrator 16A (typically a function implemented by the DSP 16). In FIG. 4, the DVB-T RF receiver 14 power control mechanism is shown schematically as the switch (SW) that is opened and closed by the GSM_TX_ON signal line 26A, such that when the GSM_TX_ON signal line 26A is asserted the switch SW is opened, and vice versa.

In that the DVB-T receiver 14, 16 uses the above-referenced Reed-Solomon coding RS(204,188,t=8), the receiver is enabled to correct up to eight erroneous bytes in a received word of 204 bytes. Therefore, the adverse effect of periodically shutting down the DVB-T receiver 14, and destroying up to about one half of the currently received symbol information, can be compensated for at least to a first order by the error correction capability of the DVB-T channel coding.

Note in FIG. 5 that the GSM burst overlays the DVB-T reception bits and, because the GSM burst is not synchronized to the DVB-T symbol stream, slides over the DVB-T symbol stream so that no two time-wise adjacent DVB-T symbols are impaired by the same amount. Since the DVB-T DSP 16 has knowledge of the occurrence of the GSM burst, by the assertion of the GSM_TX_ON signal line 26A, it ignores that part of the received DVB-T symbol. A correct symbol determination can still be accomplished, however, since the symbol detection is performed by operating the integrator 16A over the input signal form, and then comparing the integration result to a symbol detection threshold value. In many cases the symbol detection will be accurate if the signal to noise ratio (SNR) is adequate, even though the received DVB-T waveform is not integrated over the entire symbol time of 1173 microseconds.

It is also possible to simply ignore some or all impaired DVB-T symbols, and rely on the inherent error correction capability to attempt to supply the correct bit symbol. However, this approach is not preferred.

It is pointed out that the GSM_TX_ON signal may be selectively asserted as a function of the actual GSM transmit channel that is in use. For example, if the GSM transmitter 24 is operating at a frequency other than one close to the 880 MHz lower boundary of the GSM transmission range (e.g., one nearer to the 915 MHz upper boundary), then the CMT DSP 26 may not assert the signal on the GSM_TX_ON signal line 26A. Conversely, if the DVB-T reception is being made from a frequency channel other than one close to the 862 MHz upper boundary of the DVB-T reception range, then the DVB-T DSP 16 may ignore an assertion of the GSM_TX_ON signal 26A and to continue to receive and integrate the DVB-T symbol stream during the GSM burst. In this case it is preferred to provide a mechanism for the operation of the GSM_TX_ON signal 26A to be overridden for the receiver 14 power off or power savings mode. This can be readily accomplished by having the DSP 16 generate the signal that controls the state (open/closed) of the switch SW in FIG. 4. Alternatively, a communication path may be provided from the DSP 16 to the DSP 26, whereby the DVB-T DSP 16 informs the CMT DSP 26 of what DVB-T frequency band it is operating in. In this case, the CMT DSP 26 may assert the GSM_TX_ON signal 26A only for certain combinations of DVB-T and GSM operational frequencies.

Figure 6:
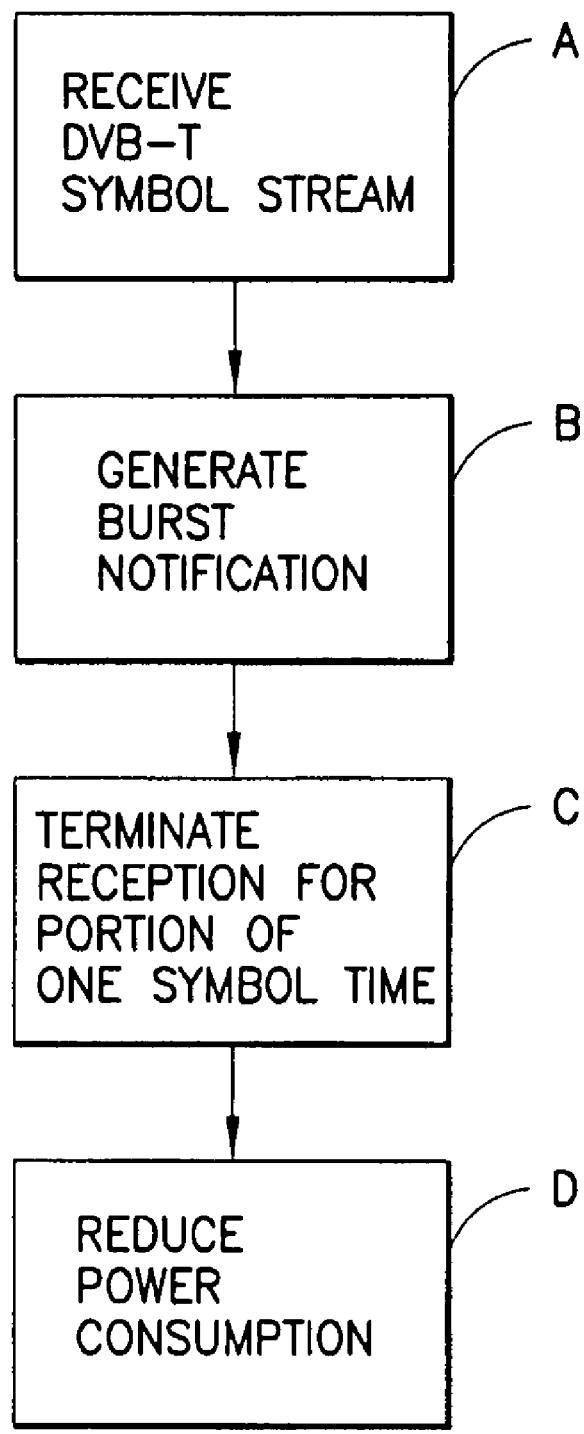
FIG. 6 is a logic flow diagram that illustrates a method in accordance with this invention.

FIG. 6 is a logic flow diagram in accordance with a method of this invention. The method is executed for the device 10 having the first antenna 12 and the second antenna 20 and is used for operating the receiver 14, 16 that is coupled to the first antenna 12 in combination' with the transmitter 24 that is coupled to the second antenna 20. The method includes, at Step A, receiving information in a symbol-wise manner with the receiver 14, 16 in a first band of RF frequencies; at Step B, generating a notification of an occurrence of a burst transmission from the transmitter 24; and at Step C, in response to the notification, terminating the reception of the information for a portion of one symbol time corresponding to a duration of the burst transmission. The method may include an optional Step D of further in response to the notification, reducing power consumption by turning off at least the receiver 14 for a period of time corresponding to the duration of the burst transmission.

The invention has been described thus far in terms of specific examples of frequency bands and the like. However, it should be kept in mind, as was discussed previously, that these teachings can be applied to other frequency bands, such as the frequency bands of 764-776 MHz and 794-806 MHZ that are allocated in the U.S. for DTV broadcasts, and to the cellular transmission band from 824-849 MHz possibly containing TDMA and/or CDMA cellular systems.

Thus, while described above in the context of presently preferred embodiments, it can be appreciated that certain changes in form and details may be made therein, and that the modified method and apparatus will still fall within the teachings of this invention. For example, those skilled in the art should realize that the assertion of the GSM_TX_ON signal may not be exactly the duration of, and synchronous in time with, the GSM burst. This is so as it may be desirable to assert the GSM_TX_ON signal prior to the start of the burst to give the receiver 14 adequate time to shut down, and to de-assert the GSM_TX_ON signal just prior to the end of the burst to give the receiver 14 time to power back up. Alternatively, it may be desirable to hold the GSM_TX_ON signal asserted for some period of time after the burst ends to avoid coupling any of the burst energy into the receiver 14, and thereby possibly negatively affecting the receiver 14 settling time. Thus, when reference is made herein to asserting the GSM_TX_ON signal for the duration of the GSM burst, it should be realized that the GSM_TX_ON signal may not be asserted for exactly the duration of the GSM burst, and furthermore that its edges may lead and/or lag the start and end of the GSM burst.

It should also be appreciated that other unnecessary DVB-T circuitry may also be shut-down, or at least power reduced, by the assertion of the GSM_TX_ON signal, such as portions of the DSP 16 and other circuitry that may be idled by the temporary cessation of reception of the DVB-T symbol stream.

Also, while the above disclosure of the presently preferred embodiments has concentrated on the use of the DVB-T and GSM systems, those skilled in the art should realize that these should not be read as limitations on the practice of this invention, and that other types of communications systems using the same or different frequency bands may also benefit from the use of this invention.

Note as well that in some embodiments a single high performance DSP may be used for achieving the functionality of both the DSP 16 and the DSP 26. In this case the GSM_TX_ON signal may be simply an internal signal or even a flag set in a register or a memory location that software that implements the DVB-T functionality responds to in the manner described above. In this case one may still refer to two DSPs, but the distinction is then more of a logical than a physical one.

What is claimed is:

1. A method, comprising:
    receiving with a receiver in a first device, information in a symbol-wise manner in a digital video broadcast reception band of radio frequencies;
    generating a notification of an occurrence of a burst transmission in a second band of radio frequencies from a transmitter in the first device, where the generating occurs when the burst transmission in the second band of radio frequencies is at least within a frequency range of 880 MHz to 897.5 MHz; and
    in response to the notification, ignoring the received information for a portion of one symbol time corresponding to a duration of the burst transmission, where the ignoring the received information for the portion of the one symbol time occurs when the information in the digital video broadcast reception band is received at least within a frequency range of 666 MHz to 862 MHz.

2. The method as in claim 1, comprising in response to the notification, reducing power consumption by turning off said receiver for a period of time corresponding to the duration of the burst transmission.

3. The method as in claim 1, where the digital video broadcast reception band of radio frequencies comprises 470-862 MHz, and where the second band of radio frequencies comprises 880-915 MHz.

4. The method as in claim 1, where the digital video broadcast reception band of radio frequencies comprises a 470-862 MHz reception band, and where the second band of radio frequencies comprises a global system for mobile communication 880-915 MHz transmission band.

5. The method as in claim 1, where a duration of a symbol time is about 1173 microseconds, and where the duration of the burst is about 577 microseconds.

6. The method as in claim 5, where bits are continuously received through said receiver, and where said bursts occur spaced apart by about 4616 microseconds.

7. The method as in claim 1, where the receiver is coupled to a first antenna in tuned to at least the digital video broadcast reception band of radio frequencies and the transmitter is coupled to a second antenna tuned to at least the second band of radio frequencies.

8. The method as in claim 1, in which the information in the symbol-wise manner is received through a first antenna and the burst transmission in the second band of radio frequencies is transmitted through a second antenna, where the first antenna and the second antenna are co-located in the first device.

9. The method as in claim 1, further comprising compensating for the ignored information that is received.

10. An apparatus comprising,
    a receiver configured to receive information in a digital video broadcast reception band of radio frequencies,
    a transmitter configured to transmit data in bursts in a second band of radio frequencies, and
    a display device configured to display at least information that is received through said receiver, said receiver receiving information in a symbol-wise manner in the digital video broadcast reception band of radio frequencies and comprising a first processor configured to process the received symbols,
    a second processor configured to control the transmission of bursts from said transmitter in the second band of radio frequencies and generate a notification of a transmission of a burst for said first processor, where the generating occurs when the burst transmission in the second band of radio frequencies is at least within a frequency range of 880 MHz to 897.5 MHz, and
    responsive to a receipt of the notification, said first processor configured to ignore the received information for a portion of one symbol time corresponding to a duration of the transmission burst, where the ignoring the received information for the portion of the one symbol time occurs when the information in the digital video broadcast reception band is received at least within a frequency range of 666 MHz to 862 MHz.

11. The apparatus as in claim 10 further comprising, responsive to the receipt of the notification, said first processor configured to reduce power consumption by turning off said receiver for a period of time corresponding to the duration of the transmission burst.

12. The apparatus as in claim 10, where the digital video broadcast reception band of radio frequencies comprises 470-862 MHz, and where the second band of radio frequencies comprises 880-915 MHz.

13. The apparatus as in claim 10, where the digital video broadcast reception band of radio frequencies comprises a digital video broadcast 470-862 MHz reception band, and where the second band of radio frequencies comprises a global system for mobile communication 880-915 MHz transmission band.

14. The apparatus as in claim 10, where a duration of a symbol time is about 1173 microseconds, and where the duration of the burst is about 577 microseconds.

15. The apparatus as in claim 14, where bits are continuously received through said receiver, and where said bursts occur spaced apart by about 4616 microseconds.

16. The apparatus as in claim 10, where the receiver is coupled to a first antenna tuned to at least the digital video broadcast reception band of radio frequencies and the transmitter is coupled to a second antenna in tuned to at least the second band of radio frequencies.

17. The apparatus as in claim 10, in which the information in the digital video broadcast reception band of radio frequencies is received through a first antenna and the burst transmission in the second band of radio frequencies is transmitted through a second antenna, where the first antenna and the second antenna are co-located in the apparatus.

18. The apparatus as in claim 10, comprising the first processor configured to compensate for the ignored information that is received.

19. An apparatus comprising
- a receiver having an input coupled to a first antenna and configured to receive information in a digital video broadcast 470-862 MHz reception band;
- a display screen configured to display information received through the receiver;
- a user input device configured to provide interactivity with the apparatus;
- a global system for mobile communication transmitter configured to transmit at least user input data from said apparatus, said transmitter having an output configured to be coupled to a second antenna in a 880-915 MHz transmission band;
- at least one processor configured to generate a notification of a transmission of a global system for mobile communication burst, where the generating occurs when the burst transmission is at least within a frequency range of 880 MHz to 897.5 MHz; and
- responsive to the generation of the notification, the at least one processor configured to ignore the digital video broadcast reception for a portion of one symbol time corresponding to a duration of the transmission burst, where the ignoring the received information for the portion of the one symbol time occurs when the information in the digital video broadcast reception band is received at least within a frequency range of 666 MHz to 862 MHz.

20. The apparatus as in claim 19, comprising, responsive to the generation of the notification, the at least one processor is further configured to reduce battery power consumption by turning off the receiver for a period of time corresponding to the duration of the burst transmission.

21. The apparatus as in claim 19, where the first antenna and the second antenna are co-located in the apparatus.

22. An apparatus comprising,
- at least one processor; and
- at least one memory including computer program code, where the at least one memory and the computer program code are configured, with the at least one processor to cause the apparatus to at least:
  - receive information in a symbol-wise manner in a digital video broadcast reception band of radio frequencies;
  - generate a notification of an occurrence of a burst transmission in a second band of radio frequencies from the apparatus, where the generating occurs when the burst transmission in the second band of radio frequencies is at least within a frequency range of 880 MHz to 897.5 MHz; and
  - responsive to the notification, ignore the received information for a portion of one symbol time corresponding to a duration of the burst transmission, where the ignoring the received information for the portion of the one symbol time occurs when the information in the digital video broadcast reception band is received at least within a frequency range of 666 MHz to 862 MHz.

23. The apparatus as in claim 22, comprising, responsive to the notification, the apparatus is caused to reduce battery power consumption by turning off a receiver configured to receive the information for a period of time corresponding to the duration of the burst transmission.

24. The apparatus as in claim 22, which the information in the digital video broadcast reception band of radio frequencies is received through a first antenna and the burst transmission in the second band of radio frequencies is transmitted through a second antenna, where the first antenna and the second antenna are co-located in the apparatus.

25. A non-transitory computer readable medium encoded with a computer program executable by a processor to perform actions comprising:
- receiving with a receiver in a first device, information in a symbol-wise manner in a digital video broadcast reception band of radio frequencies;
- generating a notification of an occurrence of a burst transmission in a second band of radio frequencies from a transmitter in the first device, where the generating occurs when the burst transmission in the second band of radio frequencies is at least within a frequency range of 880 MHz to 897.5 MHz; and
- in response to the notification, ignoring the received information for a portion of one symbol time corresponding to a duration of the burst transmission, where the ignoring the received information for the portion of the one symbol time occurs when the information in the digital video broadcast reception band is received at least within a frequency range of 666 MHz to 862 MHz.

26. The non-transitory computer readable medium encoded with a computer program as in claim 25, comprising further in response to the notification, reducing power consumption by turning off said receiver for a period of time corresponding to the duration of the burst transmission.

* * * * *

UNITED STATES PATENT AND TRADEMARK OFFICE
CERTIFICATE OF CORRECTION

PATENT NO. : 7,865,167 B2  
APPLICATION NO. : 10/164177  
DATED : January 4, 2011  
INVENTOR(S) : Leinonen et al.

It is certified that error appears in the above-identified patent and that said Letters Patent is hereby corrected as shown below:

Claim 7, col. 8, line 5 delete "in".

Claim 16, col. 9, line 1 delete "in".

Claim 24, col. 10, line 22 insert --in-- before "which".

Signed and Sealed this  
Eighth Day of March, 2011

David J. Kappos  
*Director of the United States Patent and Trademark Office*